US011674495B2

(12) United States Patent
Correa Antunes

(10) Patent No.: US 11,674,495 B2
(45) Date of Patent: Jun. 13, 2023

(54) MECHANICAL ENGINE FOR POWER GENERATION THROUGH WATER MOVEMENT

(71) Applicant: Hamilton Correa Antunes, Charqueadas (BR)

(72) Inventor: Hamilton Correa Antunes, Charqueadas (BR)

( * ) Notice: Subject to any disclaimer, the term of this patent is extended or adjusted under 35 U.S.C. 154(b) by 0 days.

(21) Appl. No.: 17/414,709

(22) PCT Filed: Jan. 29, 2019

(86) PCT No.: PCT/BR2019/050024
§ 371 (c)(1),
(2) Date: Jun. 16, 2021

(87) PCT Pub. No.: WO2019/241861
PCT Pub. Date: Dec. 26, 2019

(65) Prior Publication Data
US 2022/0065216 A1   Mar. 3, 2022

(30) Foreign Application Priority Data

Jun. 21, 2018  (BR) .................... BR102018012716-0
Jan. 17, 2019  (BR) .................... BR102019001010-0

(51) Int. Cl.
*F03B 13/26*   (2006.01)

(52) U.S. Cl.
CPC .... *F03B 13/262* (2013.01); *F05B 2260/4022* (2013.01); *F05B 2260/4031* (2013.01)

(58) Field of Classification Search
CPC ............ F03B 13/262; F05B 2260/4022; F05B 2260/4031
See application file for complete search history.

(56) References Cited

U.S. PATENT DOCUMENTS

| 2008/0284173 | A1* | 11/2008 | Stansby | ............... | F03B 13/1865 |
| | | | | | 290/53 |
| 2010/0043425 | A1* | 2/2010 | Dragic | ................ | F03B 13/1815 |
| | | | | | 60/504 |
| 2017/0045119 | A1* | 2/2017 | Rodriguez Ramirez | . | F16H 3/10 |

FOREIGN PATENT DOCUMENTS

| AU | 2013201756 A1 | 4/2014 |
| BR | 0303588 | 5/2005 |

(Continued)

OTHER PUBLICATIONS

International Search Report for PCT/BR2019/050024 dated Apr. 10, 2019.

*Primary Examiner* — Viet P Nguyen
(74) *Attorney, Agent, or Firm* — B. Aaron Schulman, Esq.; Stites & Harbison, PLLC

(57) ABSTRACT

MECHANICAL ENGINE FOR THE GENERATION OF ENERGY THROUGH WATER MOVEMENT, refers to a mechanical motor (1) to (41), with their auxiliary sets, with the objective of generating mechanical and electrical energy, or both, being plants electric lines with this system can be built on the banks or inside the sea, river or islands, where the cost benefit of the energy by the conventional way, does not become compensating, or practically inaccessible places, but that have waves, tides, or level differentials in waters. As these sources of energy, in water there are in abundance on the planet, possible future plants of this system, may be more spread out, and in greater quantity, thus reducing the number of posts, towers, compensation equipment, components, and transmission wires. In case of use in water navigation, this engine can be used to replace, totally or partially, conventional fuels and engines, for mechanical handling, and the generation of electric energy on board.

9 Claims, 2 Drawing Sheets

(56) References Cited

FOREIGN PATENT DOCUMENTS

| BR | PI0706330 | 6/2009 |
| BR | P11005967 | 4/2013 |
| BR | 102013018670 | 8/2015 |
| WO | WO 2016/090441 | 6/2016 |

* cited by examiner

MECHANICAL ENGINE FOR POWER GENERATION THROUGH WATER MOVEMENT

SUBJECT

The present invention relates to a mechanical motor, to generate mechanical, electrical energy, using tides, waves, level differentials, or any movement of water.

STATE OF THE ART

Conventional wind farms work with the principles of using wind speed to generate mechanical and electrical energy.

Conventional solar energy generated by photovoltaic cells, has the characteristic of transforming light into electrical energy.

Conventional solar energy by heat uses equipment that has the characteristic of generating mechanical or electrical energy, using the heat of the sun as an energy source.

Conventional hydroelectric plants work with the principle of a large water deposit, which is emptied through the blades of an electric energy generator, making it rotate, thus producing electrical energy.

Conventional thermoelectric plants produce electrical energy by burning mineral or vegetable coal, transforming this heat energy into mechanical and electrical energy.

Nuclear plants also produce mechanical and electrical energy, through fission of the nucleus of radioactive atoms.

The plants or mini plants powered by liquid fuels, some called generator sets, which are normally large combustion engines, have a generator for the production of electric energy coupled to these.

Conventional wind farms, although they seem simple, need a certain mechanical, electrical, and electronic complexity, for their good functioning, that is why their costs are still high, in relation to their production capacity.

Solar energy generated by photovoltaic cells, popularly known as solar energy panels, is normally not possible for continuous generation of energy, 24 hours a day, because it depends on sunlight, so at night, it is not possible to use it generation, in addition to having a high cost in relation to the generation capacity. Even using conventional batteries, to compensate for the moments without light or low light, the cost benefit is further impaired in relation to other ways of obtaining energy, except where the cost is not so important, and one of the few cases, are satellites artificial.

Solar heat energy, normally used in water heating, has also hindered its continuous use, as it is sporadic, that is, limiting its use only on sunny days, its cost benefit in generating mechanical energy and electrical.

Conventional hydroelectric power plants need a large area that must be flooded, causing a strong environmental impact, and are also subject to lowering their levels during the dry season, thus compromising the demands demanded, as well as the place to build one. hydroelectric plants are more critical, as are their works and high cost maintenance.

Thermoelectric plants, in addition to having a high cost, generate high levels of pollution and increase in dangerousness, in addition to having to be built in more specific places. And also coal-fired power plants, they don't work with any kind of coal.

Nuclear power plants have energy generation efficiency, but a very high risk to the health of living beings, especially human beings, so much so that some cities have been abandoned, due to these radioactive contaminations.

Plants or mini-plants powered by liquid fuels, also called generator sets, in addition to polluting the environment by burning them, generate high costs, making their use in many cases unfeasible, or due to high costs, including fuel, or high levels of pollution.

DESCRIPTION OF THE INVENTION

The invention has the basic task of drastically reducing costs in the production of mechanical and/or electrical energy on land. It can also be used to move vessels in waters. This drastically reduces the consumption of fuels for vessels' full operation. The use of the invention requires that the buoy or buoys be slid through ducts or containment rails, and must have changes in their physical forms to follow the aerodynamics of the vessels.

Mechanical or electrical energy is generated by the invention using tides, waves, water level differences, or any water movement, and also includes the use of earth's gravity, inertia. The mass times acceleration ratio principle is used to stabilize rotation and force multiplication.

The invention has the advantage of allowing power plants with this system to be built on the banks of seas, rivers, or on islands, where the cost of generating energy in the conventional ways summarized above makes them not worthwhile. Power plants with this system can also be built in inaccessible places, but where said places have waves or tides of liquids, thereby forming differences in water levels that enable the functioning of the invention. Since there are many places on the planet with different water levels, possible future plants using this system may be spread out and exist in greater quantities, thus reducing the number of posts, towers, equipment components, components, cables or wires for power transmission.

In the case of use in water navigation, the invention can be used to replace all or part of fuels, or conventional power generation systems on board, and can be used to generate mechanical and electrical energy, including to move water vessels, replacing totally or partially its conventional fuels and engines.

The invention has one or more floating elements, containing weights inside, said weights may be the water itself. The floating elements are arranged such that only 10% of the floating elements are above the sea water, while the rest are submerged in said sea water. These floating elements are hung from cables, which are wrapped around pulleys with ratchets, guaranteeing that they turn in only one direction. When the floating elements descend, the pulleys rotate on an axis that is connected to a rotation multiplier box, which in turn is connected to a flywheel in order to stabilize the rotation. Electric energy is generated by a generator using the rotation.

BRIEF DESCRIPTION OF THE DRAWINGS

FIG. 3 is a detailed view of containment rods attached to the vessel hull that the floating elements are fixed to.

DETAILED DESCRIPTION OF THE INVENTION

The mechanical engine can be installed on any floating vessels or on land/platforms where there is water with movement.

Figure 1:
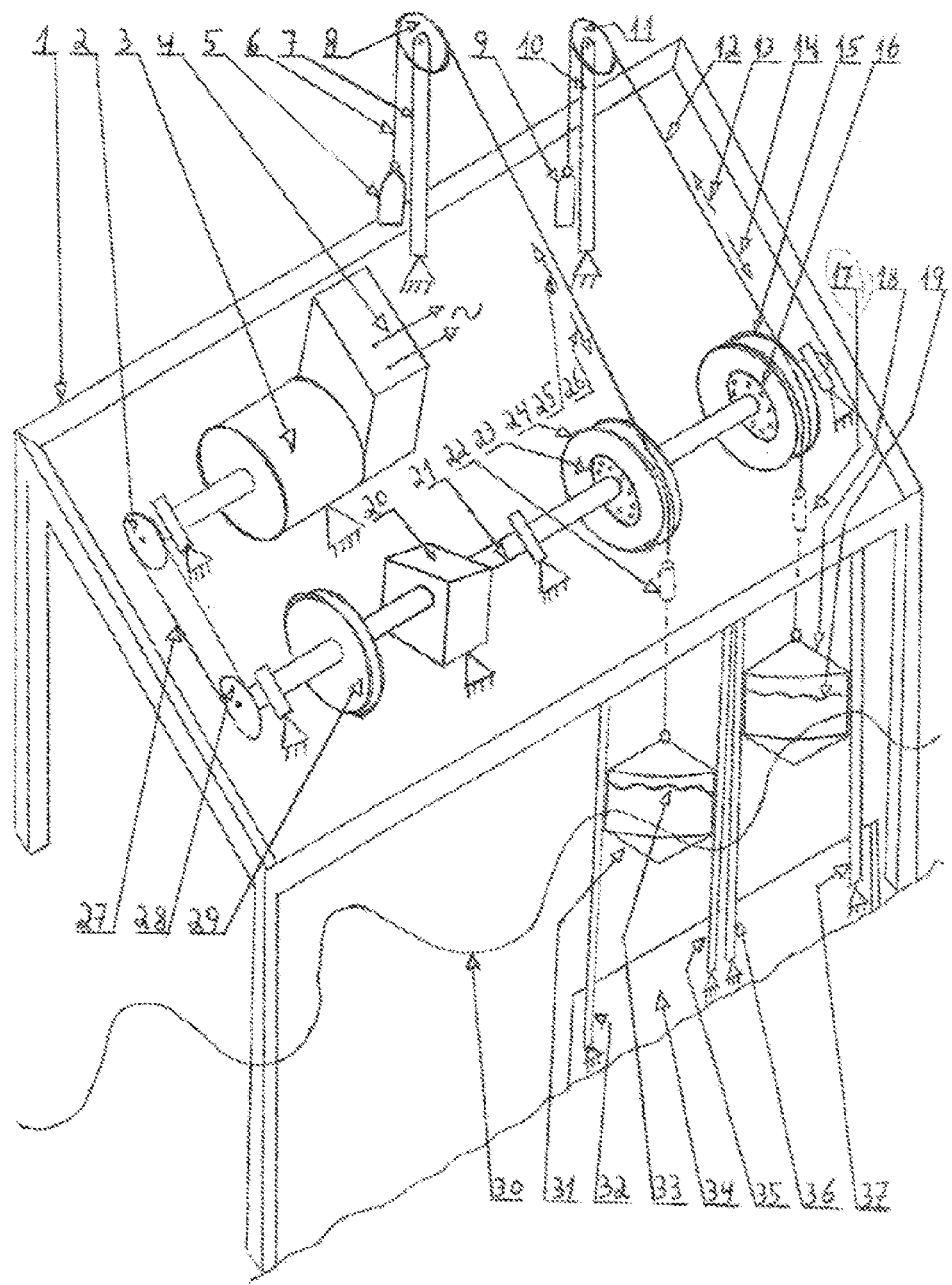
FIG. 1 is a perspective view of an embodiment of the mechanical engine for use on a platform above a body of water with water movement.

FIG. 1 illustrates a mechanical engine being mounted on a platform (1). A first floating element (31) contain a first body of weight(s) (33) inside, while a second floating element (18) contains another body of weight(s) (19) inside. Said bodies of weights (19) and (33) can be of any material, but is preferably the water taken from the body of water (30) used to power the mechanical engine. The bodies of weights (19) and (33) must be sufficiently heavy such that approximately 90% of the floating elements (18) and (31) are submerged below the body of water (30), while approximately 10% of the floating elements (18) and (31) are above the surface of the body of water (30). This is to ensure as much energy as possible is generated per mass times acceleration, inertia and gravity.

The waves, tides, or any movement of the body of water (30) cause the floating elements (18) and (31) to move upwards or downwards vertically. The floating elements (18) and (31) are fixed to ropes, cables, metal guides, or containment rods (32), (35), (36) and (37), which aid in the vertical movement of the floating elements (18) and (31). The ropes, cables, metal guides, or containment rods (32), (35), (36) and (37) ensure that the floating elements (18) and (31) move only vertically and prevent any horizontal movement due to the movement of water. The ropes, cables, metal guides, or containment rods (32), (35), (36) and (37) may be optionally fixed to an object (34) at or near the bottom of the body of water (30). The object (34) can be natural, such as sedimentary rocks near the shore, or artificial, such as an anchor.

When the movement of the body of water (30) causes the first floating element (18) to move upwards, the first cable (12) will loosen, causing the first counterweight (9), by gravity, to rotate the first pulley (15) in direction (13), through the third pulley (11), Similarly, when the movement of the body of water (30) causes the second floating element (31) to move upwards, the second cable (6) will loosen, causing the second counterweight (5), by gravity, to rotate the second pulley (24) in direction (25), through the fourth pulley (8). The third pulley (11) is supported by the first rod (7) and the first cable (12) that passes through the first hole (17), making the first pulley (15) turn through its turnstile (16), said turnstile (16) sliding smoothly on the axis (21). The fourth pulley (8) is supported by the second rod (10) and the second cable (6) that passes through the second hole (22), making the second pulley (24) turn on its turnstile (23), said turnstile (23) sliding smoothly on the axis (21).

When the movement of the body of water (30) causes the first floating element (18) to move downwards, the first cable (12) will be pulled through the first hole (17), rotating the first pulley (15) in direction (14) through its turnstile (16) on the axis (21). Similarly, when the movement of the body of water (30) causes the second floating element (31) to move downwards, the second cable will be pulled through the second hole (22), rotating the second pulley (24) through its turnstile (23) in direction (26) on the axis. The rotation of the first pulley (15) and the second pulley (24) in directions (14) and (26) activates the rotation multiplier box (20) with the appropriate multiplication ratio for the generator (3) through the flywheel (29). The flywheel (29) stabilizes the rotation through the inertia effect, which may be optionally aided by the fifth pulley (2) and the sixth pulley (28). The fifth pulley (2) and the sixth pulley (28) transmit the rotation of the flywheel (29) to the generator (3). The fifth pulley (2) and the sixth pulley (28) are connected by a third cable (27). The generator (3) generates an output voltage (4).

A slight change in speed in the flywheel (29) will not change the output voltage (4) of the generator (3). Most generators have automatic voltage control, which keeps the voltage output (4) constant regardless of the generator speed (3) within a limit.

Figure 2:
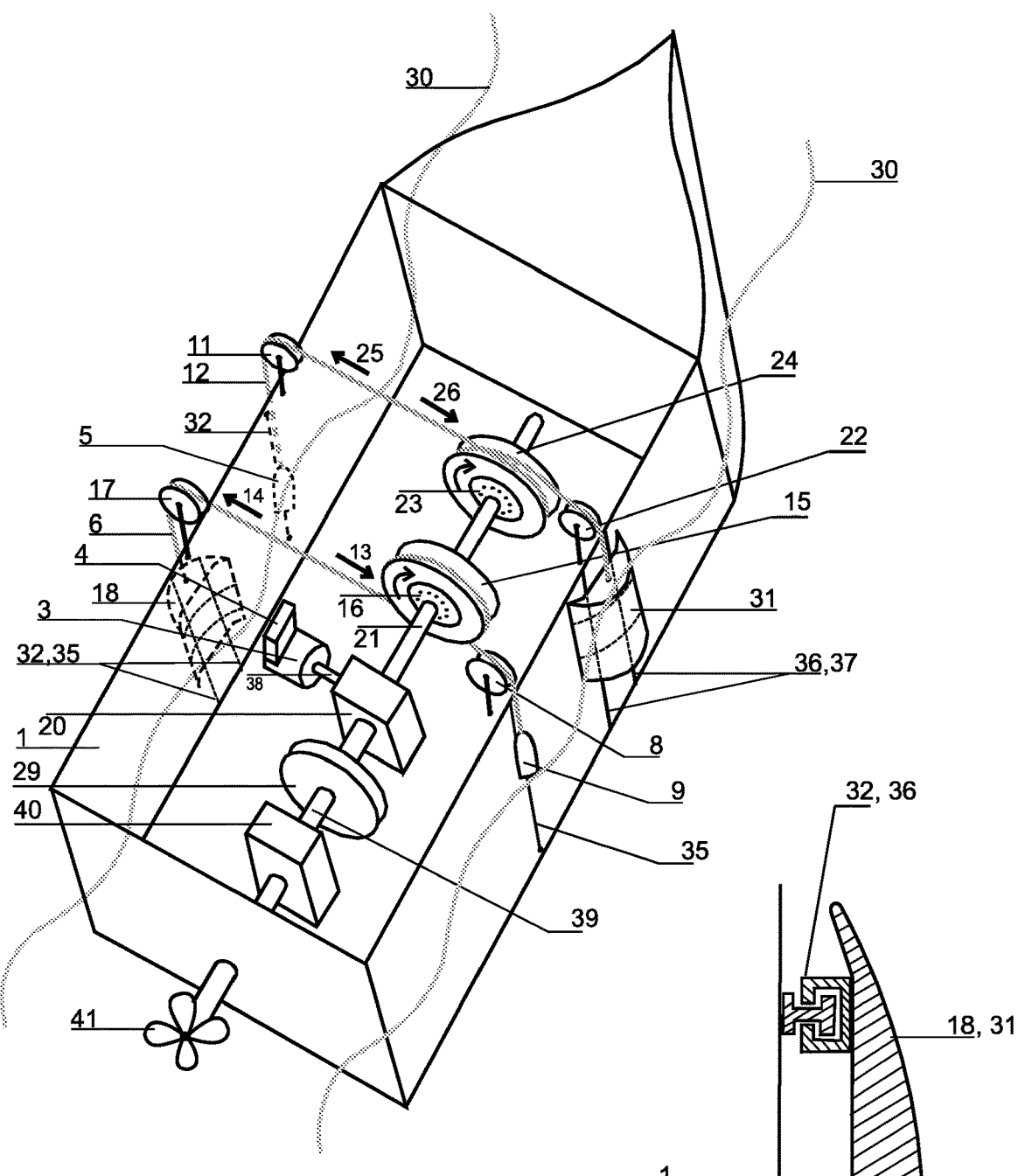
FIG. 2 is a perspective view of an embodiment of the mechanical engine for use on a vessel hull in a body of water with water movement.

FIG. 2 illustrates a mechanical engine similar described in FIG. 1, but adapted for vessel hulls (1) for movement and navigation in vessels. A first floating element (31) contain a first body of weight(s) (33) inside, while a second floating element (18) contains another body of weight(s) (19) inside. Said bodies of weights (19) and (33) can be of any material, but is preferably the water taken from the body of water (30) used to power the mechanical engine. The bodies of weights (19) and (33) must be sufficiently heavy such that approximately 90% of the floating elements (18) and (31) are submerged below the body of water (30), while approximately 10% of the floating elements (18) and (31) are above the surface of the body of water (30). This is to ensure as much energy as possible is generated per mass times acceleration, inertia and gravity.

Figure 3:
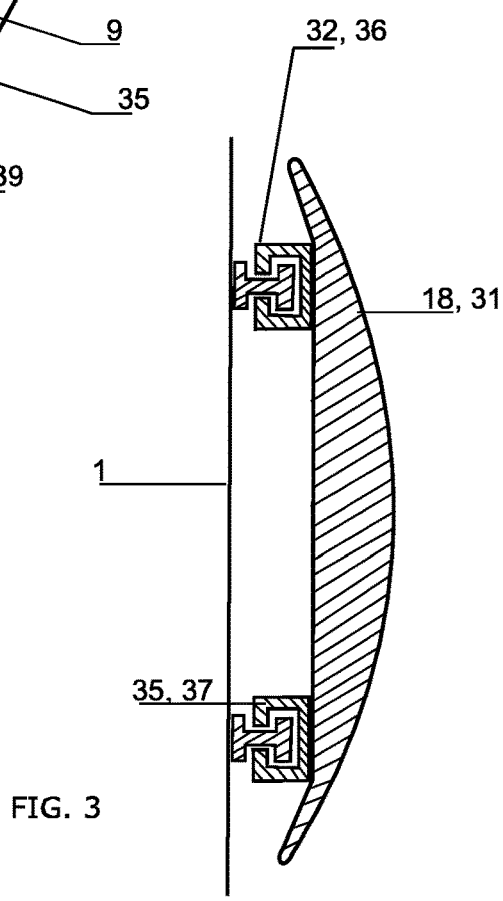

The waves, tides, or any movement of the body of water (30) cause the floating elements (18) and (31) to move upwards or downwards vertically. The floating elements (18) and (31) are fixed to ropes, cables, metal guides, or containment rods (32), (35), (36) and (37), which aid in the vertical movement of the floating elements (18) and (31). The ropes, cables, metal guides, or containment rods (32), (35), (36) and (37) ensure that the floating elements (18) and (31) move only vertically and prevent any horizontal movement due to the movement of water. FIG. 3 is an illustration of the ropes, cables, metal guides, or containment rods (32), (35), (36) and (37) being fixed to the vessel hull (1), and a floating element (18) or (31) being fixed to the ropes, cables, metal guides, or containment rods (32), (35), (36) and (37) in a manner such that only vertical and not horizontal movement of the floating element (18) or (31) is possible.

When the movement of the body of water (30) causes the first floating element (31) to move upwards, the first cable (12) will loosen, causing the first counterweight (5), by gravity, to rotate the first pulley (24) in direction (25), through the third pulley (11) and the fifth pulley (22). Similarly, when the movement of the body of water (30) causes the second floating element (18) to move upwards, the second cable (6) will loosen, causing the second counterweight (9), by gravity, to rotate the second pulley (15) in direction (13), through the fourth pulley (8) and the sixth pulley (17). The third pulley (11) is supported by the vessel's hull (1) and the first cable (12) that passes through the fifth pulley (22), making the first pulley (24) turn through its turnstile (23), said turnstile (23) sliding smoothly on the axis (21). The fourth pulley (8) is supported by the sixth pulley (17) and the second cable (6) that passes through the sixth pulley (22), making the second pulley (15) turn on its turnstile (16), said turnstile (16) sliding smoothly on the axis (21).

When the movement of the body of water (30) causes the first floating element (31) to move downwards, the first cable (12) will be pulled through the first fifth pulley (22), rotating the first pulley (24) in direction (26) through its turnstile (23) on the axis (21). Similarly, when the movement of the body of water (30) causes the second floating element (18) to move downwards, the second cable will be pulled through the sixth pulley (17), rotating the second pulley (15) through its turnstile (16) in direction (14) on the axis. The rotation of the first pulley (24) and the second pulley (15) in directions (14) and (26) activates the rotation multiplier box (20) with the appropriate multiplication. The flywheel (29) stabilizes the rotation through the inertia effect. The rotation multiplier box (20) has a first output shaft (38) and a second output shaft (39). The generator (3) is connected to the first output shaft (38) and generates an output voltage (4). The second output shaft (39) enables the movement of the propeller (41), through the flywheel (29), and the gearbox (40), which has the function of providing gear shift, neutral, and reversing rotation.

For both mechanical engine illustrated in FIGS. 1 and 2, the weights of the counterweights (5) and (9) must be as small as possible in relation to the weights of the floating elements (18) and (31), but large enough such that they do not cause cables (6) and (12) to slip on the pulleys (15) and (24) when cables (6) and (12) are pulled by the floating heavy elements (18) and (31).

The invention claimed is:

1. A mechanical engine for use on a platform for generating mechanical energy, electrical energy, or both energies simultaneously, through water movement, said mechanical engine comprising:
   (a) a first floating element connected to a first counterweight by a first cable, and a second floating element connected to a second counterweight by a second cable, wherein the first counterweight is moved using a first pulley that is connected to the platform by a first rod, and a second counterweight is moved using a second pulley that is connected to the platform by a second rod; and
   wherein the first cable passes a first hole on the platform and the second cable passes through a second hole on the platform, and moving in an upward direction or in a downward direction rotating a third pulley through a first turnstile and a fourth pulley through a second turnstile,
   wherein the first cable rotates the third pulley and the second cable rotates the fourth pulley;
   (b) a plurality of at least one of cables, containment rods, ropes, metal guides attached to the first floating element and the second floating element,
   wherein the first floating element and the second floating element slides vertically up or vertically down the plurality of at least one of cables, containment rods, ropes, metal guides; and
   (c) a rotation multiplier box that is activated by the rotation of the third and fourth pulley with an appropriate multiplication ratio for a generator,
   wherein the generator generates an output voltage.

2. The mechanical engine according to claim 1, wherein the first and second floating elements contain enough weights such that about 90 percent of the first and second floating elements are submerged below water to maximally increase energy per mass times acceleration, inertia and gravity.

3. The mechanical engine according to claim 1, wherein a flywheel is added to the mechanical engine to increase stabilization of the rotation of the third and fourth pulley.

4. The mechanical engine according to claim 3, wherein a fifth and sixth pulley connected by a third cable is situated between the flywheel and the generator, and the fifth pulley and the sixth pulley transmit rotation of the flywheel to the generator.

5. A mechanical engine for use in a hull for generating mechanical energy, electrical energy, or both energies simultaneously, through water movement, said mechanical engine comprising:
   (a) a first floating element connected to a first counterweight by a first cable, and a second floating element connected to a second counterweight by a second cable, wherein the first counterweight is moved using a first pulley that is fixed to the hull, and a second counterweight is moved using a second pulley that is fixed to the hull; and
   wherein the first cable passes a third pulley fixed to the hull and the second cable passes through a fourth pulley fixed to the hull, and moving in an upward direction or in a downward direction rotating a fifth pulley through a first turnstile and a sixth pulley through a second turnstile,
   wherein the first cable rotates the fifth pulley and the second cable rotates the sixth pulley; and
   (b) a plurality of at least one of cables, containment rods, ropes, metal guides attached to the first floating element and the second floating element,
   wherein the first floating element and the second floating element slides vertically up or vertically down the plurality of at least one of cables, containment rods, ropes, metal guides; and
   (c) a rotation multiplier box that is activated by the rotation of the third and fourth pulley with an appropriate multiplication ratio for a generator,
   wherein the generator generates an output voltage.

6. The mechanical engine according to claim 5, wherein the first and second floating elements contain enough weights such that about 90 percent of the first and second floating elements are submerged below water to maximally increase energy per mass times acceleration, inertia and gravity.

7. The mechanical engine according to claim 5, wherein a flywheel is added to the mechanical engine to increase stabilization of the rotation of the fifth and sixth pulley.

8. The mechanical engine according to claim 5, further comprising a gearbox for changing the engine gear to neutral and reversing rotation.

9. The mechanical engine according to claim 5, further comprising a propeller.

* * * * *